(12) United States Patent
Nakayama et al.

(10) Patent No.: US 11,453,385 B2
(45) Date of Patent: Sep. 27, 2022

(54) HYBRID VEHICLE CONTROLLER

(71) Applicant: KAWASAKI MOTORS, LTD., Hyogo (JP)

(72) Inventors: Kyotaro Nakayama, Kakogawa (JP); Daisuke Yanase, Koto-ku (JP); Daisuke Kawai, Kobe (JP); Tomoki Tada, Kobe (JP)

(73) Assignee: KAWASAKI MOTORS, LTD., Akashi (JP)

( * ) Notice: Subject to any disclaimer, the term of this patent is extended or adjusted under 35 U.S.C. 154(b) by 87 days.

(21) Appl. No.: 17/247,552

(22) Filed: Dec. 16, 2020

(65) Prior Publication Data

US 2021/0197794 A1 Jul. 1, 2021

(30) Foreign Application Priority Data

Dec. 18, 2019 (JP) .............................. JP2019-227984

(51) Int. Cl.
| | |
|---|---|
| *B60W 20/40* | (2016.01) |
| *B60W 10/02* | (2006.01) |
| *B60W 10/06* | (2006.01) |
| *B60W 10/08* | (2006.01) |
| *B60W 20/20* | (2016.01) |

(52) U.S. Cl.
CPC ............ *B60W 20/40* (2013.01); *B60W 10/02* (2013.01); *B60W 10/06* (2013.01); *B60W 10/08* (2013.01); *B60W 20/20* (2013.01); *B60W 2300/36* (2013.01)

(58) Field of Classification Search
CPC ...... B60W 20/40; B60W 20/20; B60W 20/10; B60W 10/02; B60W 10/06; B60W 10/08; B60W 30/192; B60Y 2300/192; B60Y 2300/49; B60Y 2300/64; B60K 2006/268; B60K 6/20; B60K 6/38; B60K 6/387; B60K 6/48; B60K 2006/4825; B62J 45/00; B62J 45/41; B62J 45/412; B62M 23/02; B62M 2300/367
See application file for complete search history.

(56) References Cited

U.S. PATENT DOCUMENTS

| | | | |
|---|---|---|---|
| 7,165,638 B2 | 1/2007 | Ito et al. | |
| 9,115,682 B2 | 8/2015 | Gibson et al. | |
| 2002/0170758 A1 | 11/2002 | Shimabukuro et al. | |
| 2009/0312143 A1* | 12/2009 | Allgaier | B60K 6/547 |
| | | | 903/946 |
| 2018/0162372 A1* | 6/2018 | Colavincenzo | B60L 58/20 |

FOREIGN PATENT DOCUMENTS

| | | | |
|---|---|---|---|
| JP | 2017065384 A | 4/2017 | |
| WO | WO-2014103937 A1 * | 7/2014 | ............... B60K 6/38 |
| WO | 2015151849 A1 | 10/2015 | |
| WO | 2020173514 A1 | 9/2020 | |

\* cited by examiner

*Primary Examiner* — George C Jin
(74) *Attorney, Agent, or Firm* — Alleman Hall Creasman & Tuttle LLP

(57) ABSTRACT

A hybrid vehicle controller is configured to: upon receiving a predetermined mode switching request, bring a clutch into a half-clutch state to start an engine using rotation of a transmission shaft; and upon determining that the engine has started, shift the clutch from the half-clutch state to a stand-by state and subsequently shift the clutch to an engaged state, the stand-by state being a state which is intermediate between the half-clutch state and a disengaged state and in which drive power of the engine is not transmitted to the transmission shaft.

9 Claims, 6 Drawing Sheets

STATE TRANSITION DIAGRAM

HYBRID VEHICLE CONTROLLER

CROSS-REFERENCE TO RELATED APPLICATION

This application claims priority to and the benefit of Japanese Patent Application No. 2019-227984, filed on Dec. 18, 2019, the entire disclosure of which is incorporated herein by reference.

BACKGROUND OF THE INVENTION

Field of the Invention

The present disclosure relates to a hybrid vehicle controller for a hybrid vehicle including an engine and an electric motor as drive sources.

DESCRIPTION OF THE RELATED ART

A hybrid vehicle including an engine and an electric motor as drive sources is known. Such a hybrid vehicle is able to travel in different travel modes such as a travel mode where the engine is at rest and the electric motor is in operation (first travel mode) and a travel mode where both the engine and the electric motor are in operation (second travel mode). The hybrid vehicle switches between the travel modes according to the remaining battery charge or any other parameter.

The engine needs to be started to make a transition from the first travel mode where the engine is at rest to the second travel mode where the operation of the engine is required. A hitherto known engine start method using a starter motor is disadvantageous in that the frequent use of the starter motor entails the need for a battery larger than conventionally used batteries and results in a short service life of the starter motor.

A method in which the engine is started by using vehicle inertia arising from drive power of the electric motor (this kind of engine start is called "push start") is also known (see Japanese Laid-Open Patent Application Publication No. 2017-65384, for example). The engine start method based on push start does not require any starter motor, and is therefore considered suitable for use in engine start necessitated by switching between the travel modes.

SUMMARY OF THE INVENTION

However, the push start as described above has the following problem: if a clutch for transmitting drive power of the engine to a given transmission shaft (e.g., an input shaft of a transmission) rotated by drive power of the electric motor is merely shifted from a disengaged state to an engaged state, a rapid increase in engine torque resulting from the engine start could cause a rapid increase in rotational speed of the transmission shaft, thus hindering smooth transition from the first travel mode to the second travel mode. This problem is particularly acute in a vehicle with small inertia such as a motorcycle.

Japanese Laid-Open Patent Application Publication No. 2017-65384 mentioned above discloses control for changing the moving speed of the clutch according to the position of the clutch. However, the control as taught in this patent literature cannot sufficiently prevent the rotational speed of the transmission shaft from rapidly increasing after the engagement of the clutch.

It is therefore an object of the present disclosure to provide a hybrid vehicle controller that enables a hybrid vehicle to smoothly achieve travel mode switching involving engine start.

A hybrid vehicle controller according to an aspect of the present disclosure is a hybrid vehicle controller for a hybrid vehicle including an electric motor serving as a drive source, an engine serving as a drive source, a transmission shaft for transmitting drive power of the electric motor to a drive wheel, and a clutch operable to enable and disable transmission of drive power of the engine to the transmission shaft, the hybrid vehicle controller including a mode switching controller configured to, in response to a predetermined mode switching request, perform mode switching control for switching from a first travel mode where the engine is stopped and the drive wheel is driven by the drive power generated by the electric motor to a second travel mode where the drive wheel is driven by the drive power generated by the engine and the drive power generated by the electric motor, wherein the mode switching controller includes a clutch controller configured to switch the clutch between a disengaged state in which the drive power of the engine is not transmitted to the transmission shaft and an engaged state in which the drive power of the engine is transmitted to the transmission shaft, and the clutch controller is further configured to: upon receiving the mode switching request, bring the clutch into a half-clutch state to start the engine using rotation of the transmission shaft, the half-clutch state being a state which occurs during transition from the disengaged state to the engaged state and in which the drive power of the engine is transmitted to the transmission shaft; and upon determining that the engine has started, shift the clutch from the half-clutch state to a stand-by state and subsequently shift the clutch to the engaged state, the stand-by state being a state which is intermediate between the half-clutch state and the disengaged state and in which the drive power of the engine is not transmitted to the transmission shaft.

In the above configuration, during the switching from the first travel mode where the drive wheel is driven by drive power generated by the electric motor to the second travel mode where the drive wheel is driven by drive power generated by the engine and drive power generated by the electric motor, the clutch is brought into the half-clutch state to start the engine using the rotation of the transmission shaft, and then the clutch is shifted to the stand-by state in which the drive power of the engine is not transmitted to the transmission shaft. This can prevent the rotational speed of the transmission shaft from rapidly increasing due to a rapid increase in engine torque after the start of the engine. Thus, the engine start-involving switching from the first travel mode to the second travel mode can be smoothly accomplished.

The clutch controller may be further configured to set a pressure of an actuator for actuating the clutch to different values, the different values including a first pressure associated with the disengaged state, a second pressure associated with the engaged state and higher than the first pressure, a third pressure intermediate between the first and second pressures, and a fourth pressure intermediate between the first and third pressures, and the clutch controller may be further configured to: set the pressure of the actuator to the third pressure upon receiving the mode switching request; and upon determining that the engine has started, change the pressure of the actuator from the third pressure to the fourth pressure and subsequently change the pressure of the actuator to the second pressure.

In the above configuration, the state transition of the clutch can easily be controlled by changing the pressure of the actuator.

The mode switching controller may include a throttle opening degree controller configured to control a throttle opening degree of the engine, and the throttle opening degree controller may be further configured to set the throttle opening degree to a value equal to or greater than a reference opening degree when the clutch is in the half-clutch state.

In the above configuration, pumping loss can be reduced which occurs when the clutch is brought into the half-clutch state to start the engine using the rotation of the transmission shaft which is induced by the operation of the electric motor, and the start of the engine can be facilitated.

The mode switching controller may include: a transmission shaft torque estimator configured to estimate a torque of the transmission shaft; a load torque estimator configured to estimate a load torque applied to the hybrid vehicle; and a motor output controller configured to perform output control of the electric motor, and the motor output controller may be further configured to estimate an engine loss torque from the torque of the transmission shaft and the load torque and add the engine loss torque to a required torque of the electric motor, the engine loss torque corresponding to drive power of the electric motor which is consumed to start the engine when the clutch is in the half-clutch state.

In the above configuration, when the clutch is brought into the half-clutch state to start the engine using the rotation of the transmission shaft which is induced by the operation of the electric motor, the electric motor rotates to generate a torque corresponding to the required torque plus the estimated engine loss torque. This can prevent the decrease in rotational speed of the transmission shaft at the start of the engine. Thus, the influence of the engine start on the stability of the vehicle can be reduced.

The mode switching controller may include an engine speed controller configured to control a speed of the engine, the engine speed controller may be further configured to, when the clutch is in the stand-by state, perform rotational speed synchronization control in which a first rotational speed of the transmission shaft is adjusted to a second rotational speed of the transmission shaft, the first rotational speed being a rotational speed produced by rotation of the engine, the second rotational speed being a rotational speed produced by rotation of the electric motor, and the clutch controller may be further configured to shift the clutch to the engaged state when a difference between the first and second rotational speeds of the transmission shaft has become equal to or smaller than a predetermined reference value as a result of the rotational speed synchronization control.

In the above configuration, after the start of the engine, the clutch is kept for a period of time in the stand-by state where the drive power of the engine is not transmitted to the transmission shaft, and during this period of time the speed of the engine is adjusted to synchronize with the transmission shaft rotational speed produced by the rotation of the electric motor. Thus, the decrease in transmission shaft rotational speed upon engagement of the clutch can be prevented. As such, the engine start-involving switching from the first travel mode to the second travel mode can be accomplished smoothly and quickly.

The hybrid vehicle controller may include a required torque allocator configured to acquire a total required torque of the entire vehicle and allocate the total required torque between the electric motor and the engine, and the required torque allocator may be further configured to, after the clutch is shifted to the engaged state, perform tailing control in which an allocation state of the required torque is gradually changed from that in the first travel mode to that in the second travel mode.

In the above configuration, the allocation of the required torque to the engine is gradually increased when the allocation state of the required torque is changed from a state where all the required torque is allocated to the electric motor. This can reduce the torque fluctuation which occurs in the vehicle as a whole after the engine start. Thus, the engine start-involving switching from the first travel mode to the second travel mode can be smoothly accomplished.

The stand-by state may be set as a state in which the clutch is positioned without play to the half-clutch state.

In the above configuration, the clutch can be quickly shifted from the stand-by state to the engaged state in which the drive power of the engine is transmitted to the transmission shaft. Thus, the engine start-involving switching from the first travel mode to the second travel mode can be accomplished smoothly and quickly.

The clutch controller may be further configured to, upon receiving the mode switching request during travel of the vehicle, bring the clutch into the half-clutch state to start the engine using rotation of the transmission shaft, the rotation of the transmission shaft being induced by operation of the electric motor or inertia of the vehicle.

The hybrid vehicle may be a motorcycle.

The present disclosure enables a hybrid vehicle to smoothly achieve travel mode switching involving engine start.

DETAILED DESCRIPTION OF THE EMBODIMENTS

Hereinafter, exemplary embodiments will be described with reference to the drawings.

Figure 1:
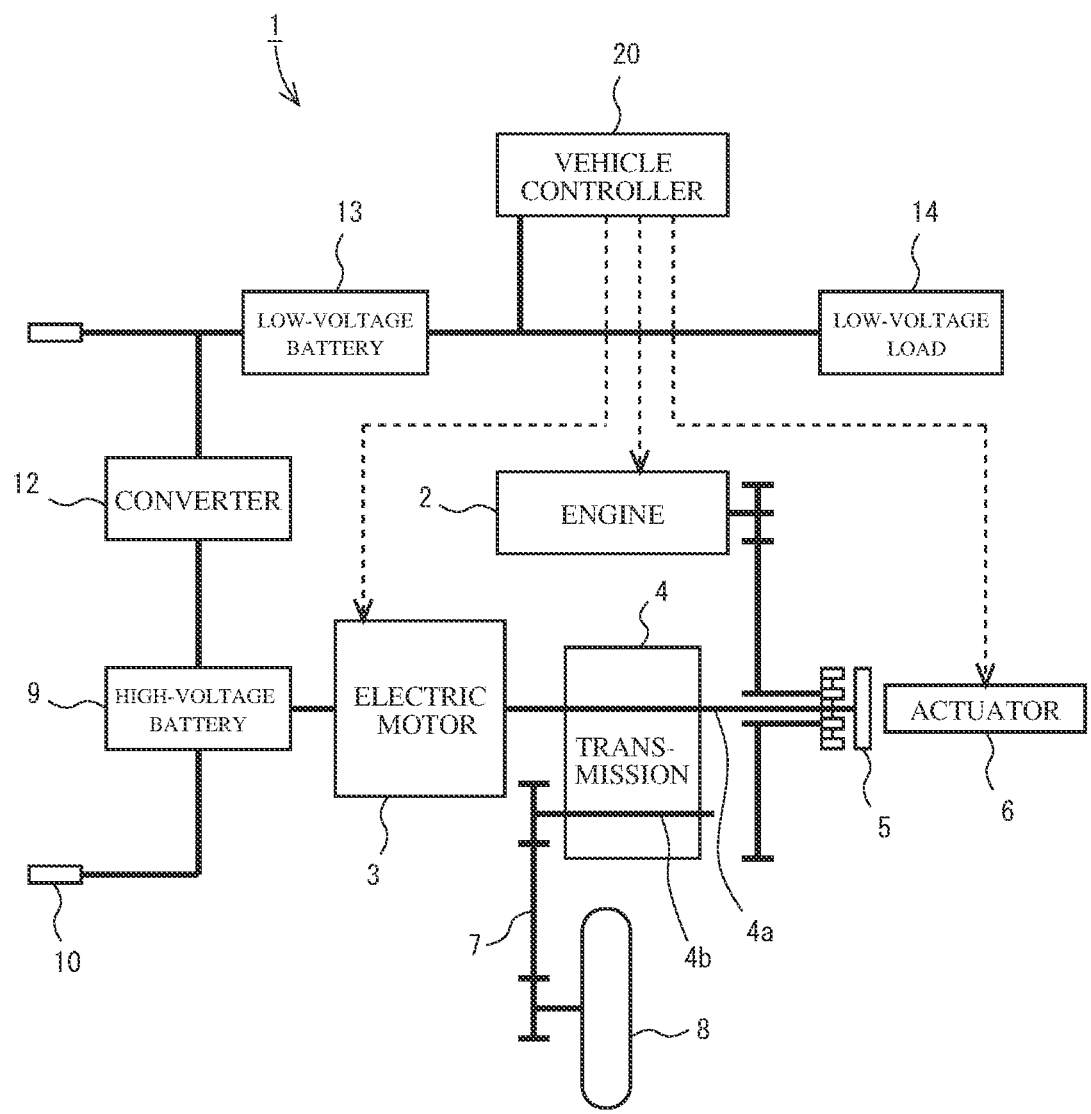
FIG. 1 is a block diagram of a hybrid vehicle according to an exemplary embodiment.

FIG. 1 is a block diagram of a hybrid vehicle 1 according to an exemplary embodiment. In the present embodiment, the hybrid vehicle 1 is a motorcycle including a rear wheel as a drive wheel 8 and a front wheel (not shown) as a driven wheel. The motorcycle is a typical example of a leaning vehicle which turns with the vehicle body tilted (leaned) in the left-right direction. The hybrid vehicle 1 may be a three- or four-wheeled vehicle.

The hybrid vehicle 1 includes an electric motor 3, an engine 2, a transmission shaft (an input shaft 4a of a transmission 4 described later) for transmitting drive power of the electric motor 3 to the drive wheel 8, and a clutch 5 operable to enable and disable transmission of drive power of the engine 2 to the transmission shaft.

More specifically, as shown in FIG. 1, the hybrid vehicle 1 includes the engine 2, the electric motor 3, the transmission 4, the clutch 5, a clutch actuator 6, an output transmission member 7, the drive wheel 8, a high-voltage battery 9, a charging port 10, a converter 12, a low-voltage battery 13, and a vehicle controller (hybrid vehicle controller) 20.

The engine 2 is an internal combustion engine. The engine 2 is a drive source for driving the drive wheel 8. The electric motor 3 is a drive source for driving the drive wheel 8 together with or instead of the engine 2. The transmission 4 changes the speed of rotation produced by rotational power output from the engine 2. The transmission 4 is, for example, a manual transmission including an input shaft 4a, an output shaft 4b, and speed change gears. In the present embodiment, the transmission shaft is configured as the input shaft 4a of the transmission 4.

The clutch 5 is engaged to enable power transmission between the engine 2 and the transmission 4 and disengaged to disable power transmission between the engine 2 and the transmission 4. The clutch actuator 6 actuates the clutch 5 such that the clutch 5 switches between the engaged state and the disengaged state. The output transmission member 7 is a member through which rotational power output from the output shaft 4b of the transmission 4 is transmitted to the drive wheel 8. The output transmission member 7 is, for example, a drive chain, a drive belt, or a drive shaft.

The high-voltage battery 9 stores high-voltage electric power (e.g., 48 V) to be supplied to the electric motor 3. The charging port 10 is connected to the high-voltage battery 9. The converter 12 reduces the voltage of DC power coming from the high-voltage battery 9 and supplies the resulting DC power to the low-voltage battery 13. The low-voltage battery 13 stores low-voltage electric power (e.g., 12 V) to be supplied to the vehicle controller 20 and other low-voltage loads 14 mounted on the hybrid vehicle 1.

The vehicle controller 20 controls the engine 2, the electric motor 3, and the actuator (clutch actuator) 6 based on information obtained by various sensors. The vehicle controller 20 may consist of a single controller or may be implemented by a plurality of separate controllers. The vehicle controller 20 includes a processor, a volatile memory, a non-volatile memory, and an I/O interface as hardware elements. The functional elements of the vehicle controller 20 will be described in detail later.

Figure 2:
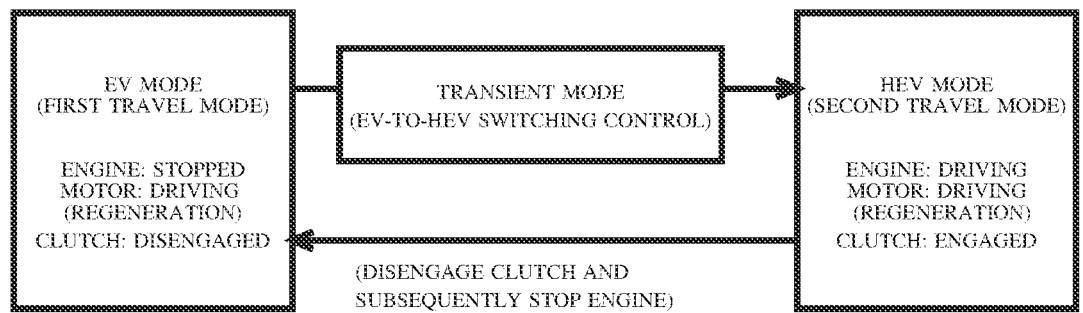
FIG. 2 is a state transition diagram illustrating travel modes of the hybrid vehicle of FIG. 1.

FIG. 2 is a state transition diagram illustrating travel modes of the hybrid vehicle 1 of FIG. 1. As shown in FIG. 2, the hybrid vehicle 1 is operable in a plurality of travel modes differing in the state of at least one of the engine 2, the electric motor 3, and the clutch 5. Specifically, the travel modes include an EV mode (first travel mode), an HEV mode (second travel mode), and a transient mode.

The EV mode (first travel mode) is a mode where the engine 2 is stopped and the drive wheel 8 is driven by drive power generated by the electric motor 3. In the EV mode, the clutch 5 is brought into the disengage state to prevent the engine 2 from causing a resistance to the operation of the electric motor 3. In the EV mode, the electric motor 3 is brought into a driving state during acceleration, while during deceleration, the electric motor 3 is brought into a regeneration state.

The HEV mode (second travel mode) is a mode where the drive wheel 8 is driven by drive power generated by the electric motor 3 and drive power generated by the engine 2. In the HEV mode, the clutch 5 is brought into the engaged state to allow the rotational power of the engine 2 to be transmitted to the drive wheel 8 through the transmission 4. In the HEV mode, the electric motor 3 is brought into the driving state during acceleration, while during deceleration, the electric motor 3 is brought into the regeneration state. The transient mode is a switching control mode which occurs in the process of transition from the EV mode to the HEV mode.

A transient state where the clutch 5 is disengaged and then the engine 2 is stopped occurs also in the process of transition from the HEV mode to the EV mode. Although not shown in FIG. 2, the travel modes of the hybrid vehicle 1 may include an engine vehicle mode (EGV mode) where the engine 2 is operated with the electric motor 3 not in operation and where the drive wheel 8 is driven by only the rotational power of the engine 2.

Figure 3:
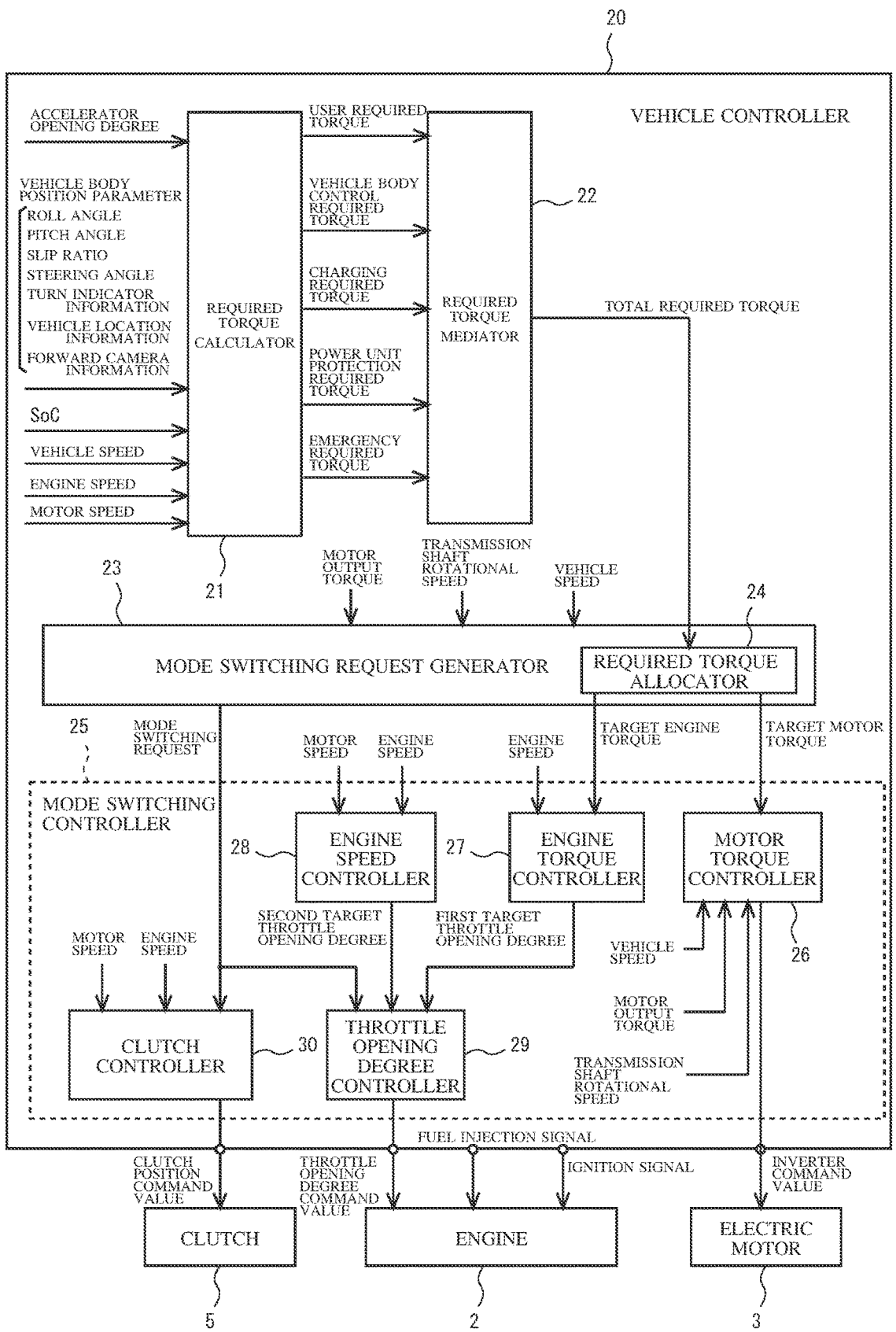
FIG. 3 is a block diagram of a hybrid vehicle controller of the hybrid vehicle of FIG. 1.

FIG. 3 is a block diagram of the vehicle controller 20 of the hybrid vehicle 1 of FIG. 1. As shown in FIG. 3, the vehicle controller 20 includes a required torque calculator 21, a required torque mediator 22, a mode switching request generator 23, a required torque allocator 24, and a mode switching controller 25. The elements 21 to 25 of the vehicle controller 20 are configured as a functional block implemented through processing that the processor performs using the volatile memory based on programs stored in the non-volatile memory.

The required torque calculator 21 calculates various required torques based on the travel state of the hybrid vehicle 1. The various required torques are calculated from parameters such as accelerator opening degree, vehicle body position parameter, state of charge (SOC), vehicle speed, engine speed, and motor speed. The various required torques include, for example, user (rider) required torque, vehicle body control required torque, charging required torque, power unit protection required torque, and emergency required torque.

The user required torque is a torque calculated from the accelerator opening degree or any other parameter based on the output state desired by the user. The accelerator opening degree refers to the amount of accelerator operation by the user and can be acquired from an output of an accelerator opening degree sensor.

The vehicle body control required torque is a torque required in terms of the vehicle body regardless of the amount of accelerator operation by the user for purposes such as falling prevention control. The vehicle body control required torque is determined based on parameters such as the vehicle body position parameter, vehicle speed, engine speed, and motor speed. The vehicle speed is calculated, for example, from a detection value of a rotational speed sensor for the driven wheel (e.g., the front wheel), and may be calculated from GPS information or any other information. The motor speed is calculated, for example, from a detection value of a rotational speed sensor mounted on the rotational shaft of the electric motor 3, and may be calculated from a control signal for the electric motor 3. The engine speed can be calculated from an output of a crank angle sensor which detects the crank angle of the crankshaft of the engine 2.

The vehicle body position parameter includes, for example, at least one selected from roll angle, pitch angle, slip ratio, steering angle, turn indicator information, vehicle location information, and forward camera information. The roll angle and the pitch angle are calculated, for example, from a detection value of an in-vehicle gyro sensor, and may be calculated from detection values of a roll angle sensor and a pitch angle sensor. The pitch angle may be calculated from the stroke amounts of the front and rear suspensions.

The slip ratio is calculated, for example, by the following equation: slip ratio=(drive wheel rotational speed−driven wheel rotational speed)/driven wheel rotational speed. The slip ratio may be the rate of increase in drive wheel rotational speed. The steering angle is calculated, for example, from a detection value of a steering angle sensor. The turn indicator information is acquired as left-turn or right-turn indicator operation information based on a signal representing an operation of the turn indicator by the user. The vehicle location information is information which is based on a detection value of a GPS sensor and map information and which represents the location of the traveling hybrid vehicle 1 on a map. The forward camera information is image information acquired by an in-vehicle camera which captures an image of the environment ahead of the hybrid vehicle 1.

The charging required torque is a torque calculated to allow the electric motor 3 to generate electricity according to the SOC (%) representing the level of charge of the high-voltage battery 9 and charge the high-voltage battery 9. When the remaining charge of the high-voltage battery 9 has decreased, the required torque calculator 21 calculates an electricity generation torque that the electric motor 3 needs to output to charge the high-voltage battery 9. This electricity generation torque is the charging required torque. The SOC can be calculated from an output of a battery level sensor.

The power unit protection required torque is a torque calculated from parameters such as the engine speed and motor speed to protect the engine 2 and the electric motor 3, such as to prevent overheating of the engine 2 and the electric motor 3. The emergency required torque is a torque calculated in the event of an emergency such as falling.

The required torque mediator 22 calculates a torque that the drive sources (the engine 2 and the electric motor 3) should output in total. This torque is referred to as a total required torque. The required torque mediator 22 performs the calculation of the total required torque based on parameters such as the priority of the various required torques calculated by the required torque calculator 21.

The mode switching request generator 23 identifies the present travel state based on the total required torque, the vehicle speed, the transmission shaft rotational speed (the rotational speed of the input shaft 4a of the transmission 4), and the motor output torque, and chooses an optimal travel mode from the plurality of travel modes described above. The transmission shaft rotational speed is calculated from a detection value of a rotational speed sensor mounted on the input shaft 4a. The mode switching request generator 23 generates a mode switching request for travel mode switching if the present travel mode is different from the chosen travel mode.

The mode switching request generator 23 allocates the total required torque between the electric motor 3 and the engine 2 in a manner appropriate to the chosen travel mode. For this purpose, the mode switching request generator 23 includes the required torque allocator 24. Based on the chosen travel mode and the total required torque, the required torque allocator 24 determines a target torque to be output from the engine 2 (target engine torque) and a target torque to be output from the electric motor 3 (target motor torque), and outputs the determined target torques.

The mode switching controller 25 switches the travel mode between the EV mode and the HEV mode in response to the mode switching request. After the mode switching, the mode switching controller 25 controls the engine 2 and the electric motor 3 in a manner appropriate to the target torques determined respectively for the engine 2 and the electric motor 3 in the post-switching travel mode. In control of the engine 2, the mode switching controller 25 controls the throttle opening degree of the engine 2 based on the target torque and the engine speed. To perform such control, the mode switching controller 25 includes a motor torque controller (motor controller) 26, an engine torque controller 27, an engine speed controller 28, a throttle opening degree controller 29, and a clutch controller 30.

The motor torque controller 26 sends an inverter command value to the electric motor 3 (in particular, an inverter of the electric motor 3) based on the target motor torque output from the mode switching request generator 23, and thus operates the electric motor 3 such that the output torque of the electric motor 3 is adjusted to the target motor torque.

The engine torque controller 27 determines a target value of the throttle opening degree (first target throttle opening degree) based on the engine speed and the target engine torque output from the mode switching request generator 23. The engine speed controller 28 determines, based on the engine speed and the motor speed, a target value of the throttle opening degree (second target throttle opening degree) that allows the engine speed to synchronize with the motor speed. The throttle opening degree controller 29 determines, based on the first and second target throttle opening degrees, a throttle opening degree command value to be finally output to the engine 2. The vehicle controller 20 generates a fuel injection signal based on the throttle opening degree command value and outputs the fuel injection signal to a fuel injector of the engine 2. The vehicle controller 20 further outputs an engine ignition signal to an igniter of the engine 2.

The clutch controller 30 outputs a clutch position command value to the clutch actuator 6 in response to the mode switching request. The clutch position command value is for switching the clutch 5 between the disengaged state where the drive power of the engine 2 is not transmitted to the input shaft (transmission shaft) 4a of the transmission 4 and the engaged state where the drive power of the engine 2 is transmitted to the input shaft (transmission shaft) 4a. In the present embodiment, the clutch position command value includes a command value for placing the clutch 5 in a disengaged position where the clutch 5 is in the disengaged state and a command value for placing the clutch 5 in an engaged position where the clutch 5 is in the engaged state, and further includes command values for placing the clutch 5 in a half-clutch (partially engaged) position and a stand-by position which will be described later as control positions (stop positions) of the clutch 5.

Figure 4:
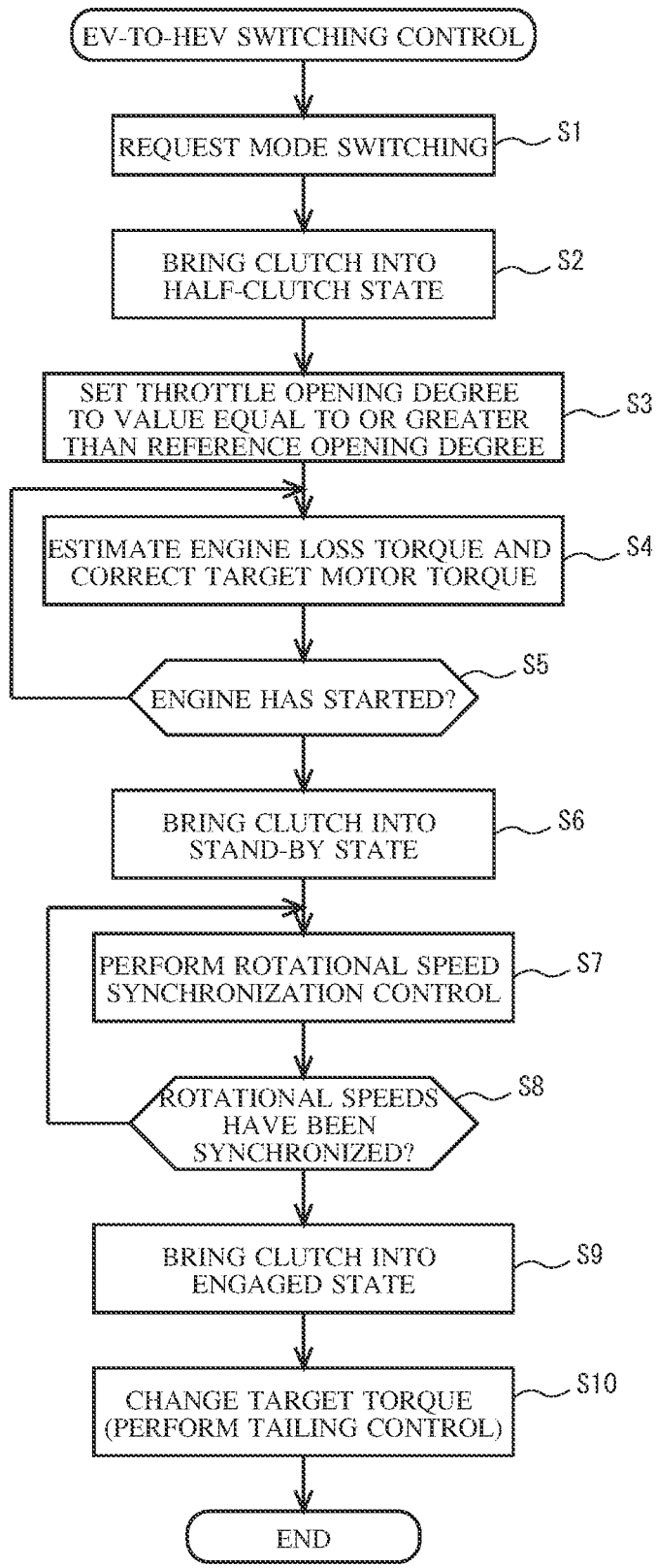
FIG. 4 is a flowchart illustrating the process flow of control for switching from an EV mode to an HEV mode in the exemplary embodiment.
Figure 5:
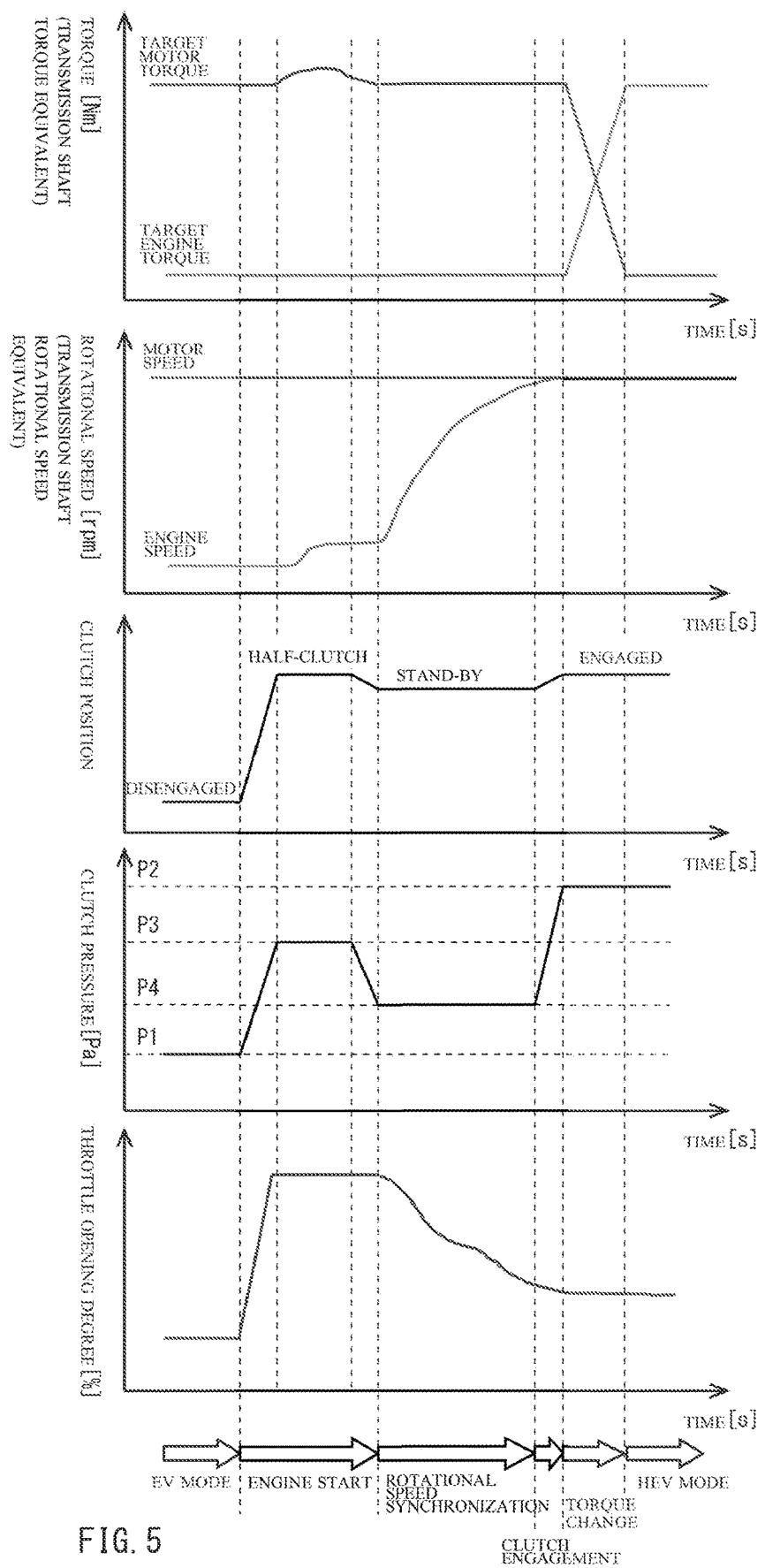
FIG. 5 presents graphs showing the changes over time in various parameters in the switching control of FIG. 4.

Hereinafter, the process flow of travel mode switching from the EV mode to the HEV mode will be described. FIG. 4 is a flowchart illustrating the process flow of control for switching from the EV mode to the HEV mode in the present embodiment. FIG. 5 presents graphs showing the changes over time in various parameters in the switching control of FIG. 4.

In FIG. 5, a graph showing the respective target torques of the engine 2 and the electric motor 3, a graph showing the respective speeds of the engine 2 and the electric motor 3, a graph showing the position of the clutch 5, a graph showing the pressure (clutch pressure) generated by the actuator 6 for the clutch 5, and a graph showing the throttle opening degree are arranged from top to bottom. In the graphs of FIG. 5, the target toques and the speeds of the engine 2 and the electric motor 3 are shown as equivalent target torques and rotational speeds of the transmission shaft (the input shaft 4a of the transmission 4).

In the EV mode, as previously stated, the clutch 5 is in the disengaged state, and the drive wheel 8 is driven by drive power generated by the electric motor 3. If, when the hybrid vehicle 1 is traveling in the EV mode, the mode switching request generator 23 determines to switch the travel mode to the HEV mode, then the mode switching request generator 23 outputs to the clutch controller 30 a mode switching request for switching from the EV mode to the HEV mode (step S1).

Upon receiving the mode switching request, the clutch controller 30 shifts the clutch 5 from the disengaged state to a half-clutch state (step S2) to effect so-called push start in which the engine 2 is started using the rotation of the transmission shaft (the input shaft 4a of the transmission 4). The "half-clutch state" of the clutch 5 is a state which occurs during transition from the disengaged state to the engaged state and in which the drive power of the engine 2 is transmitted to the input shaft 4a. In the present embodiment, as shown in FIG. 5, the clutch position in the half-clutch state is almost the same as the clutch position in the engaged state. It should be noted that the clutch pressure is lower in the half-clutch state than in the engaged state.

Specifically, upon receiving the mode switching request, the clutch controller 30 changes the pressure of the actuator 6 for actuating the clutch 5 from a first pressure P1 associated with the disengaged state to a third pressure P3 intermediate between the first pressure P1 and a second pressure P2 associated with the engaged state and higher than the first pressure P1. By thus changing the pressure of the actuator 6, the state transition of the clutch 5 can easily be controlled.

As a result of the clutch 5 being brought into the half-clutch state during travel in the EV mode, the rotational power of the input shaft 4a which is induced by the operation of the electric motor 3 or the inertia of the hybrid vehicle 1 (the rotation of the drive wheel 8) is transmitted to the crankshaft of the engine 2 and accordingly the crankshaft is rotated, so that the engine 2 is started.

In the present embodiment, control of the throttle opening degree and control of the electric motor 3 are additionally performed during the push start.

More specifically, the throttle opening degree controller 29 sets the throttle opening degree to a value equal to or greater than a reference opening degree when the clutch 5 is in the half-clutch state (step S3). In the present embodiment, the value (a command value) equal to or greater than the reference opening degree is set to a full-throttle value (throttle opening degree=100%). The throttle opening degree controller 29 increases the throttle opening degree along with the motion of the clutch 5 upon receiving the mode switching request.

The value equal to or greater than the reference opening degree need not be the full-throttle value. For example, the reference opening degree may be a predetermined opening degree greater than an opening degree for idling, and the throttle opening degree may be controlled to a value equal to or greater than the predetermined opening degree.

The motor torque controller 26 estimates an engine loss torque corresponding to drive power of the electric motor 3 which is consumed in the above-described push start of the engine 2 and adds the engine loss torque to a motor required torque of the electric motor 3, thereby correcting the target motor torque (step S4).

Figure 6:
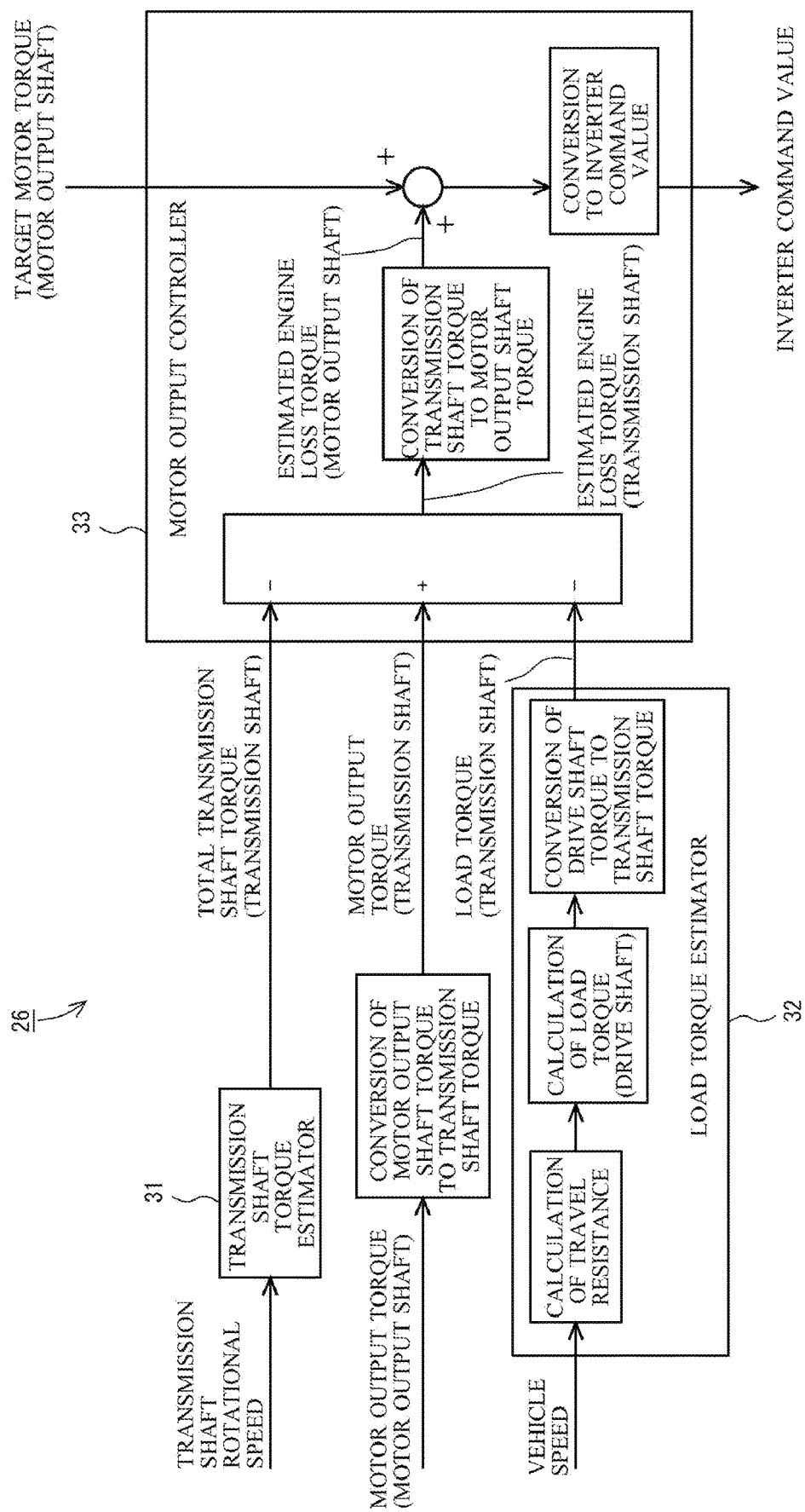
FIG. 6 is a block diagram illustrating the function of target motor torque correction of a motor torque controller shown in FIG. 3.

FIG. 6 is a block diagram illustrating the function of target motor torque correction of the motor torque controller 26 shown in FIG. 3. As shown in FIG. 6, the motor torque controller 26 includes a transmission shaft torque estimator 31, a load torque estimator 32, and a motor output controller 33 to perform the function of target motor torque correction.

The transmission shaft torque estimator 31 acquires the rotational speed of the input shaft 4a of the transmission 4 which serves as the transmission shaft (transmission shaft rotational speed), and estimates a torque generated in the input shaft 4a (total transmission shaft torque) from a change in the rotational speed. When the clutch 5 is in the half-clutch state or the engaged state, a torque increase or decrease arising from the connection of the engine 2 to the input shaft 4a is involved in the total transmission shaft torque. The load torque estimator 32 acquires the vehicle speed, calculates a load torque in the drive shaft of the drive wheel 8 from a change in the vehicle speed, and converts the load torque in the drive shaft to a load torque in the transmission shaft. The load torque is a parameter representing travel resistance such as air resistance converted into the torque in the drive shaft, and the travel resistance increases with increasing vehicle speed. Thus, the higher the vehicle speed is, the greater the load torque is.

The motor output controller 33 transforms the target motor torque to an inverter command value and performs output control of the electric motor 3. The motor output controller 33 acquires the target motor torque (uncorrected target torque) from the mode switching request generator 23. Further, the motor output controller 33 acquires the total transmission shaft torque from the transmission shaft torque estimator 31 and the load torque from the load torque estimator 32. The motor output controller 33 further acquires a motor output torque in the output shaft of the electric motor 3 and converts it to a motor output torque in the transmission shaft.

The motor output controller 33 subtracts the total transmission shaft torque from the motor output torque in the transmission shaft to calculate a torque lost in the transmission shaft due to the start of the engine 2. In the present embodiment, the motor output controller 33 subtracts the load torque from the lost toque and determines the resulting value as the estimated engine loss torque in the transmission shaft. The engine loss torque is an estimated value of the drive power of the electric motor 3 which is consumed to start the engine 2 when the clutch 5 is in the half-clutch state. The motor output controller 33 converts the engine loss torque in the transmission shaft to an engine loss torque in the output shaft of the electric motor 3.

The motor output controller 33 adds the resulting engine loss torque (the value in the output shaft of the electric motor 3) to the target motor torque output from the mode switching request generator 23 (the value in the output shaft of the electric motor 3), thereby correcting the target motor torque. That is, the motor output controller 33 adds the estimated engine loss torque to the required torque (uncorrected target motor torque) of the electric motor 3. Thus, the target motor torque correction is performed such that the greater the influence of the push start of the engine 2 on the transmission shaft torque is, the greater the target motor torque is.

In the present embodiment, as described above, the engine loss torque is obtained by adding the load torque to the difference between the total transmission shaft torque and the motor output torque. However, the load torque may be excluded from the engine loss torque. In this case, the influence of the load torque may be separately incorporated in the target motor torque, and the correction taking into account the load torque may be performed before or after the correction taking into account the engine loss torque.

The motor output controller 33 transforms the corrected target motor torque to an inverter command value and outputs the inverter command value. The electric motor 3 is subjected to inverter control based on the inverter command value, so that the output (torque) of the electric motor 3 is controlled.

The clutch controller 30 determines whether the engine 2 has started (step S5). The clutch controller 30 determines that the engine 2 has started once the engine speed becomes equal to or higher than a predetermined starting reference value.

Upon determining that the engine 2 has started (Yes in step S5), the clutch controller 30 shifts the clutch 5 from the half-clutch state to a stand-by state (step S6). The "stand-by state" is a state which is intermediate between the half-clutch state and the disengaged state and in which the drive power of the engine 2 is not transmitted to the transmission shaft (input shaft 4*a*).

In the present embodiment, as shown in FIG. 5, the clutch position in the stand-by state is close to the clutch position in the engaged state. It should be noted that the clutch pressure is lower in the stand-by state than in the half-clutch state. Specifically, upon determining that the engine 2 has been push-started, the clutch controller 30 changes the pressure of the actuator 6 from the third pressure P3 to a fourth pressure P4 intermediate between the first and third pressures P1 and P3. The stand-by state is set as a state in which the clutch 5 is positioned without play to the half-clutch state (a state in which the clutch 5 can be immediately shifted to the half-clutch state or the engaged state).

When the clutch 5 is in the stand-by state, the engine speed controller 28 performs rotational speed synchronization control (step S7) in which the transmission shaft rotational speed produced by the rotation of the engine 2 (transmission shaft rotational speed equivalent of the engine speed) is adjusted to the transmission shaft rotational speed produced by the rotation of the electric motor 3 (transmission shaft rotational speed equivalent of the motor speed). The engine speed controller 28 sets the second target throttle opening degree that allows the engine speed to be equal to the motor speed, and outputs the second target throttle opening degree. The throttle opening degree controller 29 outputs a throttle opening degree command value according to the second target throttle opening degree. The throttle opening degree controller 29 is configured as a PID controller, and the throttle opening degree is subjected to PID control.

In the rotational speed synchronization control, the engine speed controller 28 may control not only the throttle opening degree but also other parameters such as the fuel injection amount and the ignition timing.

The clutch controller 30 determines whether the transmission shaft rotational speed produced by the rotation of the engine 2 has been synchronized with the transmission shaft rotational speed produced by the rotation of the electric motor 3 (step S8). More specifically, the clutch controller 30 determines whether the difference between the transmission shaft rotational speed equivalent of the engine speed and the transmission shaft rotational speed equivalent of the motor speed has become equal to or smaller than a predetermined synchronization reference value.

Upon determining that the transmission shaft rotational speeds have been synchronized with each other (Yes in step S8), the clutch controller 30 shifts the clutch 5 to the engaged state (step S9). That is, upon determining that the transmission shaft rotational speeds have been synchronized with each other, the clutch controller 30 changes the pressure of the actuator 6 from the fourth pressure to the second pressure.

After the clutch 5 is shifted to the engaged state, the required torque allocator 24 performs tailing control (step S10) in which the allocation state of the required torque is gradually changed from that in the EV mode to that in the HEV mode. For example, the required torque allocator 24 determines that the clutch 5 has been shifted to the engaged state once the difference between the transmission shaft rotational speed equivalent of the engine speed and the transmission shaft rotational speed equivalent of the motor speed becomes equal to or smaller than the predetermined synchronization reference value.

In the EV mode of the present embodiment, the electric motor 3 bears the burden of generating 100% of the total required torque because the engine 2 is at rest. In the HEV mode, normally, the engine 2 bears the burden of generating 100% of the total required torque. If the torque generated by the engine 2 is insufficient with respect to the total required torque, the electric motor 3 generates a torque for compensating for the insufficiency.

Thus, in the present embodiment, when the travel mode is switched from the EV mode to the HEV mode, the target motor torque is changed from 100% to nearly 0% of the total required torque, and the target engine torque is changed from 0% to nearly 100% of the total required torque. The required torque allocator 24 performs the tailing control for gradually achieving the changes in the target torques. While in the example of FIG. 5 the tailing control is such that the target torques change linearly, the tailing control may be such that the target torques change non-linearly insofar as the changes are gradual.

In the above configuration, during the switching from the first travel mode (EV mode) where the drive wheel 8 is driven by drive power generated by the electric motor 3 to the second travel mode (HEV mode) where the drive wheel 8 is driven by drive power generated by the engine 2 and drive power generated by the electric motor 3, the clutch 5 is brought into the half-clutch state to start the engine 2 using the rotation of the transmission shaft (the input shaft 4*a* of the transmission 4), and then the clutch 5 is shifted to the stand-by state in which the drive power of the engine 2 is not transmitted to the transmission shaft.

If the clutch 5 is directly shifted from the half-clutch state to the engaged state after push start of the engine 2, the transmission shaft rotational speed could rapidly increase. In particular, in the case of a motorcycle in which the output torque per cylinder of the engine 2 is greater than in other kinds of vehicles such as four-wheeled automobiles, the rapid increase in transmission shaft rotational speed is likely to occur.

Shifting the clutch 5 from the half-clutch state to the stand-by state can prevent the transmission shaft rotational speed from rapidly increasing due to a rapid increase in engine torque after the start of the engine, thereby making it possible to stabilize the vehicle body. Thus, the engine start-involving switching from the first travel mode to the second travel mode can be smoothly accomplished.

Further, since the stand-by state of the clutch 5 is set as a state in which the clutch 5 is positioned without play to the half-clutch state, the clutch 5 can be quickly shifted from the stand-by state to the engaged state in which the drive power of the engine 2 is transmitted to the transmission shaft. Thus, the engine start-involving switching from the first travel mode to the second travel mode can be accomplished smoothly and quickly.

In the above configuration, when the clutch 5 is in the half-clutch state, the throttle opening degree is set to a value equal to or greater than the reference opening degree. This reduces the pumping loss which occurs when the clutch 5 is brought into the half-clutch state to start the engine 2 using the rotation of the transmission shaft which is induced by the operation of the electric motor 3, thereby facilitating the start of the engine 2.

In the above configuration, when the clutch 5 is brought into the half-clutch state to start the engine 2 using the rotation of the transmission shaft which is induced by the operation of the electric motor 3, the electric motor 3 rotates to generate a torque corresponding to the required torque plus the estimated engine loss torque.

The engine loss torque which occurs during push start of the engine 2 could cause a rapid decrease in motor speed and thus affect the stability of the hybrid vehicle 1. In particular, in the case of a motorcycle whose inertia is smaller than those of other kinds of vehicles such as four-wheeled automobiles, an increase in resistance to the rotation of the transmission shaft, which is caused by contact of the clutch 5 with the transmission shaft, significantly affects and decreases the motor speed. By subjecting the electric motor 3 to the above-described torque control including the addition of the engine loss torque, the decrease in rotational speed of the transmission shaft can be prevented at the start of the engine 2. Thus, the influence of the push start on the stability of the hybrid vehicle 1 can be reduced.

In the above configuration, after the start of the engine 2, the clutch 5 is kept for a period of time in the stand-by state where the drive power of the engine 2 is not transmitted to the transmission shaft, and during this period of time the rotational speed synchronization control is performed in which the speed of the engine 2 is adjusted to synchronize with the transmission shaft rotational speed produced by the rotation of the electric motor 3. Thus, the decrease in transmission shaft rotational speed upon engagement of the clutch 5 can be prevented, and the mode switching can be quickly completed.

In the above configuration, after the clutch 5 is shifted to the engaged state, the tailing control is further performed in which the allocation state of the required torque is gradually changed from that in the first travel mode to that in the second travel mode. That is, the allocation of the required torque to the engine 2 is gradually increased when the allocation state of the required torque is changed from a state where all the required torque is allocated to the electric motor 3. This can reduce the torque fluctuation which occurs in the vehicle as a whole after the engine start.

While an exemplary embodiment has been described above, the present disclosure is not limited to the above embodiment. Various modifications, changes, and adaptations can be made without departing from the gist of the present disclosure.

For example, while in the above embodiment the control in which the throttle opening degree is set to a value equal to or greater than the reference opening degree and the control in which the engine loss torque is estimated to correct the target motor torque are performed when the clutch 5 is in the half-clutch state, only one of the two controls may be performed, or neither of the two controls may be performed. While in the above embodiment the rotational speed synchronization control is performed when the clutch 5 is in the stand-by state, any rotational speed synchronization control need not be performed actively. While in the above embodiment the tailing control of the target torques is performed after the clutch 5 is shifted to the engaged state, the tailing control need not be performed. Whether to perform these additional controls may be chosen according to the travel state or any other parameter.

What is claimed is:

1. A hybrid vehicle controller for a hybrid vehicle, the hybrid vehicle including: an electric motor serving as a drive source; an engine serving as a drive source; a transmission shaft for transmitting drive power of the electric motor to a drive wheel; and a clutch operable to enable and disable transmission of drive power of the engine to the transmission shaft, the hybrid vehicle controller comprising a mode switching controller configured to, in response to a predetermined mode switching request, perform mode switching control for switching from a first travel mode where the engine is stopped and the drive wheel is driven by the drive power generated by the electric motor to a second travel mode where the drive wheel is driven by the drive power generated by the engine and the drive power generated by the electric motor, wherein the mode switching controller comprises a clutch controller configured to switch the clutch between a disengaged state in which the drive power of the engine is not transmitted to the transmission shaft and an engaged state in which the drive power of the engine is transmitted to the transmission shaft, and the clutch controller is further configured to:

upon receiving the mode switching request, bring the clutch into a half-clutch state to start the engine using rotation of the transmission shaft, the half-clutch state being a state which occurs during transition from the disengaged state to the engaged state and in which the drive power of the engine is transmitted to the transmission shaft; and upon determining that the engine has started, shift the clutch from the half-clutch state to a stand-by state and subsequently shift the clutch to the engaged state, the stand-by state being a state which is intermediate between the half-clutch state and the disengaged state and in which the drive power of the engine is not transmitted to the transmission shaft.

2. The hybrid vehicle controller according to claim 1, wherein the clutch controller is further configured to set a pressure of an actuator for actuating the clutch to different values, the different values including a first pressure associated with the disengaged state, a second pressure associated with the engaged state and higher than the first pressure, a third pressure intermediate between the first and second pressures, and a fourth pressure intermediate between the first and third pressures, and the clutch controller is further configured to: set the pressure of the actuator to the third pressure upon receiving the mode switching request; and upon determining that the engine has started, change the pressure of the actuator from the third pressure to the fourth pressure and subsequently change the pressure of the actuator to the second pressure.

3. The hybrid vehicle controller according to claim 1, wherein the mode switching controller comprises a throttle opening degree controller configured to control a throttle opening degree of the engine, and the throttle opening degree controller is further configured to set the throttle opening degree to a value equal to or greater than a reference opening degree when the clutch is in the half-clutch state.

4. The hybrid vehicle controller according to claim 1, wherein the mode switching controller comprises: a transmission shaft torque estimator configured to estimate a torque of the transmission shaft; a load torque estimator configured to estimate a load torque applied to the hybrid vehicle; and a motor output controller configured to perform output control of the electric motor, and the motor output controller is further configured to estimate an engine loss torque from the torque of the transmission shaft and the load torque and add the engine loss torque to a required torque of the electric motor, the engine loss torque corresponding to drive power of the electric motor which is consumed to start the engine when the clutch is in the half-clutch state.

5. The hybrid vehicle controller according to claim 1, wherein the mode switching controller comprises an engine speed controller configured to control a speed of the engine, the engine speed controller is further configured to, when the clutch is in the stand-by state, perform rotational speed synchronization control in which a first rotational speed of the transmission shaft is adjusted to a second rotational speed of the transmission shaft, the first rotational speed being a rotational speed produced by rotation of the engine, the second rotational speed being a rotational speed produced by rotation of the electric motor, and the clutch controller is further configured to shift the clutch to the engaged state when a difference between the first and second rotational speeds of the transmission shaft has become equal to or smaller than a predetermined reference value as a result of the rotational speed synchronization control.

6. The hybrid vehicle controller according to claim 1, further comprising a required torque allocator configured to acquire a total required torque of the entire vehicle and allocate the total required torque between the electric motor and the engine, wherein the required torque allocator is further configured to, after the clutch is shifted to the engaged state, perform tailing control in which an allocation state of the required torque is gradually changed from that in the first travel mode to that in the second travel mode.

7. The hybrid vehicle controller according to claim 1, wherein the stand-by state is set as a state in which the clutch is positioned without play to the half-clutch state.

8. The hybrid vehicle controller according to claim 1, wherein the clutch controller is further configured to, upon receiving the mode switching request during travel of the vehicle, bring the clutch into the half-clutch state to start the engine using rotation of the transmission shaft, the rotation of the transmission shaft being induced by operation of the electric motor or inertia of the vehicle.

9. The hybrid vehicle controller according to claim 1, wherein the hybrid vehicle is a motorcycle.

* * * * *